Patented Aug. 4, 1936

2,049,725

UNITED STATES PATENT OFFICE 2,049,725

INSECTICIDE

Lloyd E. Smith, Washington, D. C., dedicated to the free use of the Public in the United States of America No Drawing. Application March 20, 1935, Serial No. 11,976

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

I have found that organic compounds made by heating diaryl ethers with sulphur in the presence of a suitable catalyst such as anhydrous aluminum chloride, iodine, etc., are effective in killing many species of insects whether applied externally or internally; that these organic products may be sprayed or dusted upon delicate vegetation without injuring it; that these materials are even more effective than lead arsenate and other commonly used insecticides and that they are relatively non-toxic to warm-blooded animals. Suitable products according to this invention are phenothioxins, dibenzophenothioxins (either alpha- or beta-); and various derivatives of these compounds such as alkyl, nitro, amino and halogeno derivatives. Compounds found by attaching substituents to sulphur are also suitable for insecticidal use.

One of the preferred compounds comprised in my invention is phenothioxin. This is made by heating together diphenyl ether, sulphur, and a suitable catalyst such as anhydrous aluminum chloride, iodine, etc. The reaction is essentially as follows:

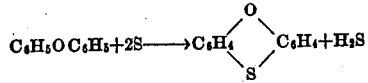

Phenothioxin occurs as colorless crystals melting at 60° centigrade. It is insoluble in water but soluble in organic solvents. The product of the above reaction may be reduced to impalpable powder by grinding and applied to vegetation either dry as a dust or wet as a spray. The product being soluble in refined mineral oils, may be applied as a component of an oil emulsion spray. When applied as a spray in water it is desirable to incorporate an effective wetting agent such as one of the so-called sulphonated oils. Phenothioxin may also be applied by dissolving it in acetone and pouring the acetone into water whereupon a fine colloidal precipitate is formed. This may be applied directly to plants or it may be combined with a suitable wetting agent and then sprayed.

The value of phenothioxin as an insecticide in comparison with rotenone and lead arsenate is shown by the following tests:

1. Upon mosquito larvæ in aqueous solutions phenothioxin in all concentrations up to 1 part in 500,000 was as effective as rotenone.

2. In laboratory tests upon codling moth phenothioxin with bentonite as a wetting agent as a spray was at the same dosage more effective than lead arsenate.

3. As a spray in a kerosene solution phenothioxin was effective against house flies.

Having thus described my invention I claim:

1. An insecticide containing as its essential active ingredient a diaryl thioxine.

2. An insecticide containing as its essential active ingredient phenothioxin.

3. A material for use in combating economically harmful plant and animal organisms containing as its essential active ingredient a diaryl thioxins.

LLOYD E. SMITH.